(12) United States Patent
Li-On et al.

(10) Patent No.: US 9,292,208 B2
(45) Date of Patent: *Mar. 22, 2016

(54) PROCESSING INPUT/OUTPUT REQUESTS USING PROXY AND OWNER STORAGE SYSTEMS

(71) Applicant: INTERNATIONAL BUSINESS MACHINES CORPORATION, Armonk, NY (US)

(72) Inventors: Oren Li-On, Ramat-Gan (IL); Orit Nissan-Messing, Hod HaSharon (IL); Eyal Perek, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/573,563

(22) Filed: Dec. 17, 2014

(65) Prior Publication Data

US 2015/0154128 A1 Jun. 4, 2015

Related U.S. Application Data

(63) Continuation of application No. 14/339,906, filed on Jul. 24, 2014, now Pat. No. 8,938,564, which is a continuation of application No. 13/915,922, filed on Jun. 12, 2013, now Pat. No. 8,819,317.

(51) Int. Cl.
| | |
|---|---|
| G06F 13/38 | (2006.01) |
| G06F 3/06 | (2006.01) |
| G06F 11/22 | (2006.01) |
| G06F 11/30 | (2006.01) |
| G06F 13/12 | (2006.01) |
| G06F 13/42 | (2006.01) |

(52) U.S. Cl.
CPC .............. *G06F 3/0611* (2013.01); *G06F 3/061* (2013.01); *G06F 3/0604* (2013.01); *G06F 3/067* (2013.01); *G06F 3/0629* (2013.01); *G06F 3/0635* (2013.01); *G06F 3/0659* (2013.01); *G06F 3/0665* (2013.01); *G06F 3/0673* (2013.01); *G06F 3/0683* (2013.01); *G06F 11/2221* (2013.01); *G06F 11/3041* (2013.01); *G06F 13/122* (2013.01); *G06F 13/385* (2013.01); *G06F 13/4221* (2013.01)

(58) Field of Classification Search
None
See application file for complete search history.

(56) References Cited

U.S. PATENT DOCUMENTS

| | | |
|---|---|---|
| 6,209,023 B1 | 3/2001 | Dimitroff et al. |
| 6,356,977 B2 | 3/2002 | Ofek et al. |
| 6,400,730 B1 | 6/2002 | Latif et al. |
| 6,405,294 B1 | 6/2002 | Hayter |
| 6,557,048 B1 | 4/2003 | Keller et al. |

(Continued)

OTHER PUBLICATIONS

Bigang et al., Design and Implementation of a Storage Virtualization System Based on SCSI Target Simulator in SAN p. 122-127, v. 10 n. 1, Tsinghua Science and Technology.

*Primary Examiner* — Scott Sun
(74) *Attorney, Agent, or Firm* — Griffiths & Seaton PLLC

(57) ABSTRACT

A first storage system is configured as a proxy for a logical volume stored on a second storage system. A probe request verifying availability of the logical volume is conveyed to an identified port, and upon receiving a response from a second storage system verifying the availability of the logical volume for an I/O request, the I/O request is conveyed to the identified port, a result of the I/O request is received from the identified port, the result is conveyed to the host computer.

21 Claims, 4 Drawing Sheets

(56) References Cited

U.S. PATENT DOCUMENTS

| | | |
|---|---|---|
| 6,718,402 B1 | 4/2004 | Arroyo |
| 6,915,354 B1 | 7/2005 | Ozdemir et al. |
| 6,922,761 B2 | 7/2005 | O'Connell et al. |
| 6,934,799 B2 | 8/2005 | Acharya et al. |
| 6,976,103 B1 | 12/2005 | Watanabe et al. |
| 7,103,712 B2 | 9/2006 | Mizuno |
| 7,173,929 B1 | 2/2007 | Testardi |
| 7,321,925 B2 | 1/2008 | Trethewey |
| 7,340,639 B1 | 3/2008 | Lee et al. |
| 7,409,442 B2 | 8/2008 | Basham et al. |
| 7,577,169 B1 | 8/2009 | Dinh et al. |
| 7,594,024 B2 | 9/2009 | Shah et al. |
| 7,610,467 B2 | 10/2009 | Mimatsu et al. |
| 7,634,588 B2 | 12/2009 | Okada et al. |
| 7,640,408 B1 | 12/2009 | Halligan et al. |
| 7,668,981 B1 | 2/2010 | Nagineni et al. |
| 7,707,151 B1 | 4/2010 | Blumenau et al. |
| 7,757,055 B2 | 7/2010 | Tsukada et al. |
| 7,778,157 B1 | 8/2010 | Tawri et al. |
| 7,904,681 B1 | 3/2011 | Bappe et al. |
| 7,937,617 B1 | 5/2011 | Nagineni et al. |
| 8,028,110 B1 | 9/2011 | Wigmore |
| 8,060,710 B1 | 11/2011 | Don et al. |
| 8,086,896 B2 | 12/2011 | Allen et al. |
| 8,122,225 B2 | 2/2012 | Recio et al. |
| 8,160,070 B2 | 4/2012 | Dai et al. |
| 8,166,163 B2 | 4/2012 | Ma et al. |
| 8,230,187 B1 | 7/2012 | Krinke, II et al. |
| 8,254,388 B2 | 8/2012 | Kikuchi et al. |
| 8,270,420 B2 | 9/2012 | Wang et al. |
| 8,301,812 B1 | 10/2012 | Riordan et al. |
| 8,359,379 B1 | 1/2013 | Sen |
| 8,370,588 B2 | 2/2013 | Nakajima et al. |
| 8,380,852 B2 | 2/2013 | Allen et al. |
| 8,386,610 B2 | 2/2013 | Yahalom et al. |
| 8,417,895 B1 | 4/2013 | De La Iglesia |
| 8,429,446 B2 | 4/2013 | Hara et al. |
| 8,601,220 B1 | 12/2013 | Corbin et al. |
| 8,713,356 B1 | 4/2014 | Chan et al. |
| 8,819,317 B1 | 8/2014 | Li-On et al. |
| 2002/0071386 A1 | 6/2002 | Gronke |
| 2002/0073297 A1 | 6/2002 | Mizuno et al. |
| 2002/0193146 A1 | 12/2002 | Wallace et al. |
| 2002/0194407 A1 | 12/2002 | Kim |
| 2003/0067890 A1 | 4/2003 | Goel et al. |
| 2003/0212785 A1 | 11/2003 | Jibbe |
| 2005/0157730 A1 | 7/2005 | Grant et al. |
| 2005/0210144 A1 | 9/2005 | Kumagai et al. |
| 2006/0291392 A1 | 12/2006 | Alicherry et al. |
| 2008/0270564 A1 | 10/2008 | Rangegowda et al. |
| 2009/0037638 A1 | 2/2009 | Izuta et al. |
| 2009/0213736 A1 | 8/2009 | Liu et al. |
| 2009/0292834 A1 | 11/2009 | Neemidge et al. |
| 2010/0011114 A1 | 1/2010 | Thomas et al. |
| 2010/0070722 A1 | 3/2010 | Otani et al. |
| 2010/0161843 A1 | 6/2010 | Spry |
| 2010/0185794 A1 | 7/2010 | Belyakov et al. |
| 2010/0262772 A1 | 10/2010 | Mazina |
| 2011/0004707 A1 | 1/2011 | Spry et al. |
| 2011/0179414 A1 | 7/2011 | Goggin et al. |
| 2012/0137098 A1 | 5/2012 | Wang et al. |
| 2012/0221790 A1 | 8/2012 | Nunez et al. |
| 2012/0278280 A1 | 11/2012 | Broido et al. |
| 2012/0278572 A1 | 11/2012 | Broido et al. |
| 2013/0007364 A1* | 1/2013 | Xiong ............... H04L 67/1097 711/114 |
| 2013/0046949 A1 | 2/2013 | Colgrove et al. |
| 2013/0067163 A1* | 3/2013 | Velayudhan ............ G06F 13/12 711/114 |
| 2013/0339647 A1 | 12/2013 | Jindo et al. |

* cited by examiner

PROCESSING INPUT/OUTPUT REQUESTS USING PROXY AND OWNER STORAGE SYSTEMS

CROSS-REFERENCE TO RELATED APPLICATIONS

This Application is a Continuation of U.S. patent application Ser. No. 14/339,906, filed Jul. 24, 2014, which is a Continuation of U.S. patent application Ser. No. 13/915,922, filed Jun. 12, 2013, both of which are hereby incorporated by reference in their entirety.

FIELD OF THE INVENTION

The present invention relates generally to storage systems, and specifically to a storage facility configured to process input/output requests via a proxy storage system.

BACKGROUND

In a storage area network (SAN), remote computer storage devices such as disk arrays can be made accessible to host computers so that the storage devices appear as if they are locally attached to the host computer's operating system. SANs may be implemented using Small Computer System Interface (SCSI) storage devices, in which SCSI protocol entities perform input/output (I/O) operations (e.g., data reads and writes) and are exposed through a unique identifier such as a logical unit number (LUN) on a path. A given LUN typically corresponds to a logical volume, and may be represented within the host computer's operating system as a device. Interaction with a LUN is initiated by a SCSI initiator port on a host computer, which can issue various I/O request types to the LUN on a target data storage device.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including configuring a first storage system as a proxy for a logical volume stored on a second storage system, conveying, to an identified port, a probe request to verify an availability of a logical volume for an I/O request, and upon receiving a response from a second storage system verifying the availability of the logical volume for the I/O request, conveying the I/O request to the identified port, receiving a result of the I/O request from the identified port, and conveying the result to the host computer.

There is also provided, in accordance with an embodiment of the present invention a proxy storage system, including a proxy port coupled to a storage area network (SAN), and a processor configured to convey, to an identified owner port, a probe request to verify an availability of a logical volume for an I/O request, and upon receiving, via the proxy port, a response from a owner storage system confirming the availability of the logical volume for the I/O request, to convey the I/O request to the identified owner port, to receive a result of the I/O request from the identified owner port, and to convey the result to the host computer.

There is further provided, in accordance with an embodiment of the present invention an owner storage system, including a storage device configured to store a logical volume, multiple ports configured to communicate with a proxy storage system via a storage area network (SAN), and a processor configured, to receive, via one of the ports, a probe request from the proxy storage system to verify an availability of the logical volume for an input/output (I/O) request from a host computer in communication with the proxy storage system, the logical volume being mapped between the host computer and the proxy storage system, to verify the availability of the logical volume for the I/O request, and subsequent to conveying a response to the proxy storage system confirming the availability of the logical volume for the I/O request, to receive the I/O request from the proxy storage system via the one of the ports, to process the I/O request, and to convey a result of the I/O request to the proxy storage system via the one of the ports.

BRIEF DESCRIPTION OF THE DRAWINGS

The disclosure is herein described, by way of example only, with reference to the accompanying drawings, wherein.

DETAILED DESCRIPTION OF EMBODIMENTS

There may be instances when a storage administrator wants to migrate the logical volume from a first storage system to a second storage system in order to balance the storage utilization across the storage systems. Embodiments of the present invention provide methods and mechanisms for seamlessly migrating the logical volume from the first storage system to the second storage system. As explained hereinbelow, after copying the logical volume to the second storage system, the first storage system can be configured as a proxy for the logical volume that is now stored on the second storage system, thereby enabling the first storage system to continue to receive and process input/output (I/O) requests for the logical volume. In embodiments described herein the first storage system may also be referred to as a proxy storage controller and the second storage controller may also be referred to as an owner storage controller, wherein the proxy and the owner storage controllers comprise Small Computer System Interface (SCSI) based storage systems that communicate over a multipath Small Computer System Interface (SCSI) based storage area network (SAN).

Figure 1:
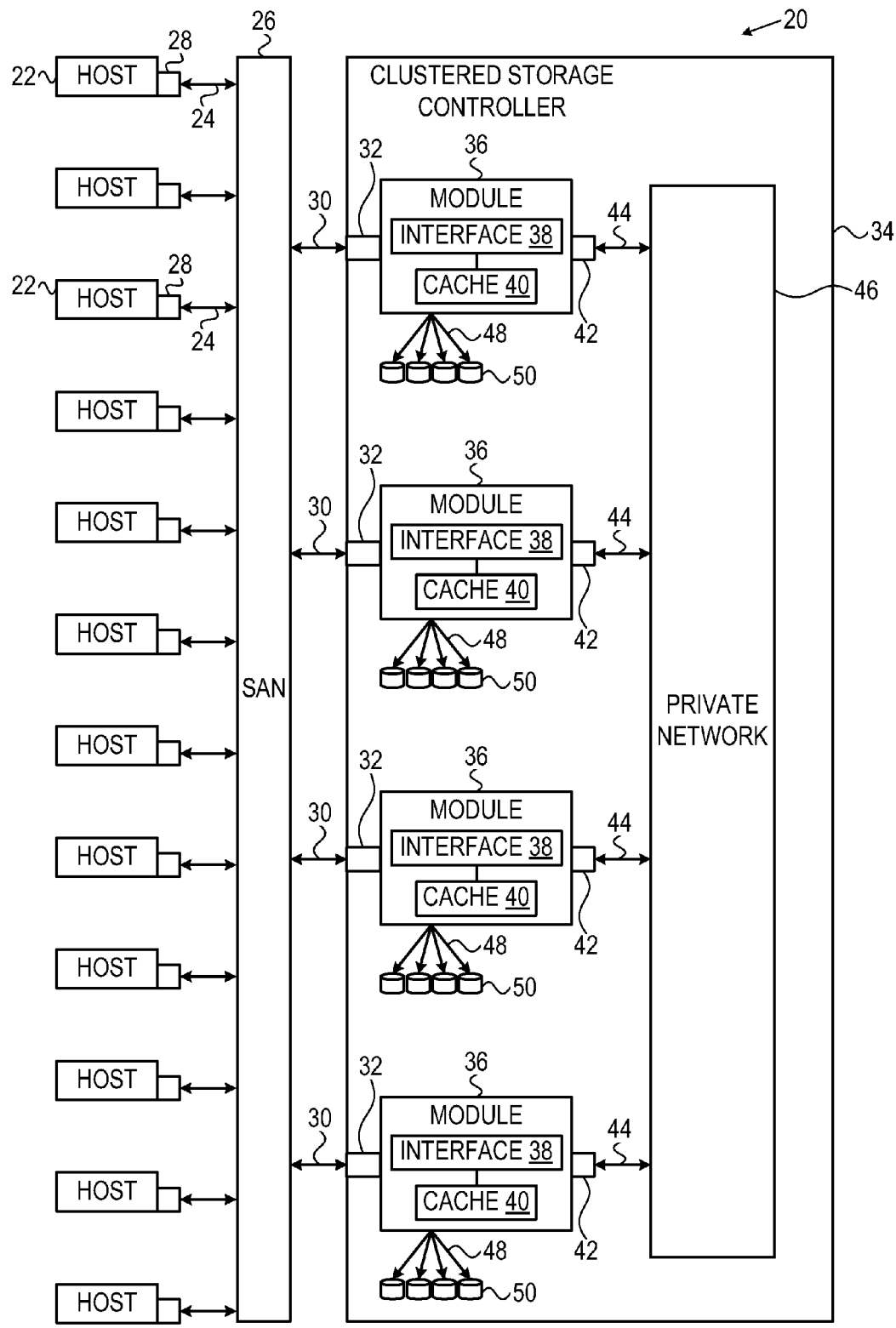
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

Figure 2:
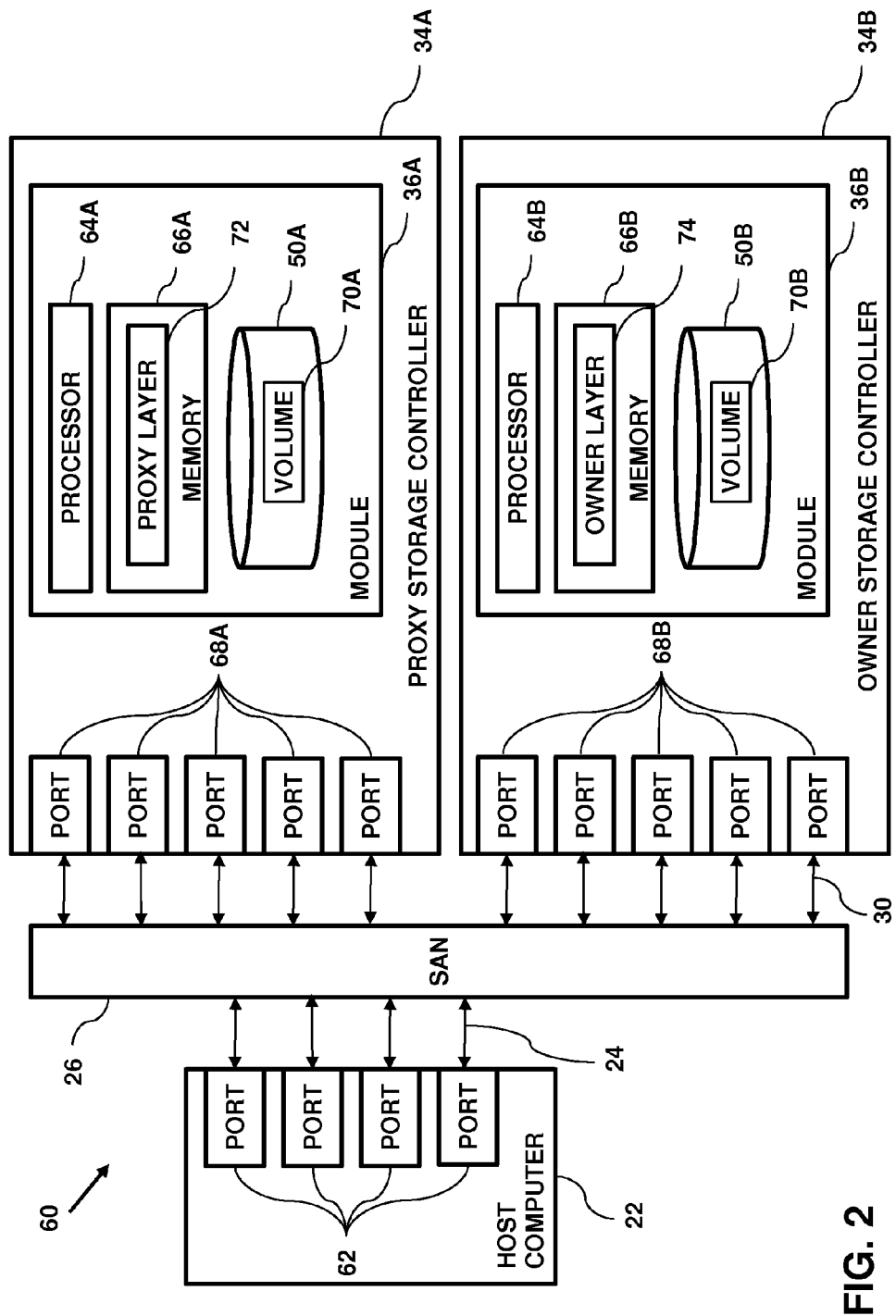
FIG. 2 is a block diagram of a facility comprising multiple storage systems configured to process proxy input/output (I/O) requests, in accordance with an embodiment of the present invention.

FIG. 2 is a block diagram of a facility 60 configured to process proxy input/output requests, in accordance with an embodiment of the present invention. In the description herein, storage controllers 34 and their respective components may be differentiated by appending a letter to the identifying numeral, so that facility 60 comprises host computer 22 and storage controllers 34A and 34B that are configured to communicate with each other via SAN 26. In embodiments herein, storage controller 34A may also be referred to as a first storage controller 34 or as a proxy storage controller 34, and storage controller 34B may also be referred to as a second storage controller 34 or an owner storage controller 34.

Host computer 22 communicates with SAN 26 via ports 62. Module 36 comprises a processor 64 and a memory 66, and communicates with SAN 26 via ports 68. In some embodiments ports 62 and 68 may comprise SCSI ports, and the SCSI ports may be configured within module 36. In embodiments herein, ports 68A may also be referred to as proxy ports and ports 68B may also be referred to as owner ports.

While for purposes of illustrative simplicity, the configuration in FIG. 2 shows module 36 comprising a single storage device 50 storing a single logical volume 70, module 36 typically comprises multiple storage devices 50 storing multiple logical volumes 70. Additionally, a given logical volume 70 may be stored across multiple storage devices 50 in a given storage controller 34.

In embodiments of the present invention, processor 64A executes, from memory 66A, a proxy layer 72 that enables processor 64A to receive, from host computer 22, an I/O request for volume 70B (also referred to herein as a request to perform an I/O operation on volume 70B), to convey the I/O request to the owner storage controller, to receive a response for the I/O request from the owner storage controller, and to convey the response to the host computer. Processor 64B executes, from memory 66B, an owner layer 74 that enables processor 64B to receive, from the proxy storage controller, an I/O request from host computer 22 for volume 70B, to process the I/O request, and to convey a response to the I/O request to the proxy storage controller. In embodiments herein, an I/O request that storage controller 34A receives from host computer 22 for volume 70B that that is forwarded to storage controller 34B may also be referred to as a proxy I/O request.

Processor 64 typically comprises a general-purpose central processing unit (CPU), which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Proxy Storage Controller I/O Request Processing

In embodiments of the present invention, storage controller 34A system can be configured as a proxy for logical volume 70B that is stored on the storage controller 34B. In operation, volume 70B is mapped between host computer 22 and storage controller 34A, even though volume 70B is physically stored on storage controller 34B.

Figure 3:
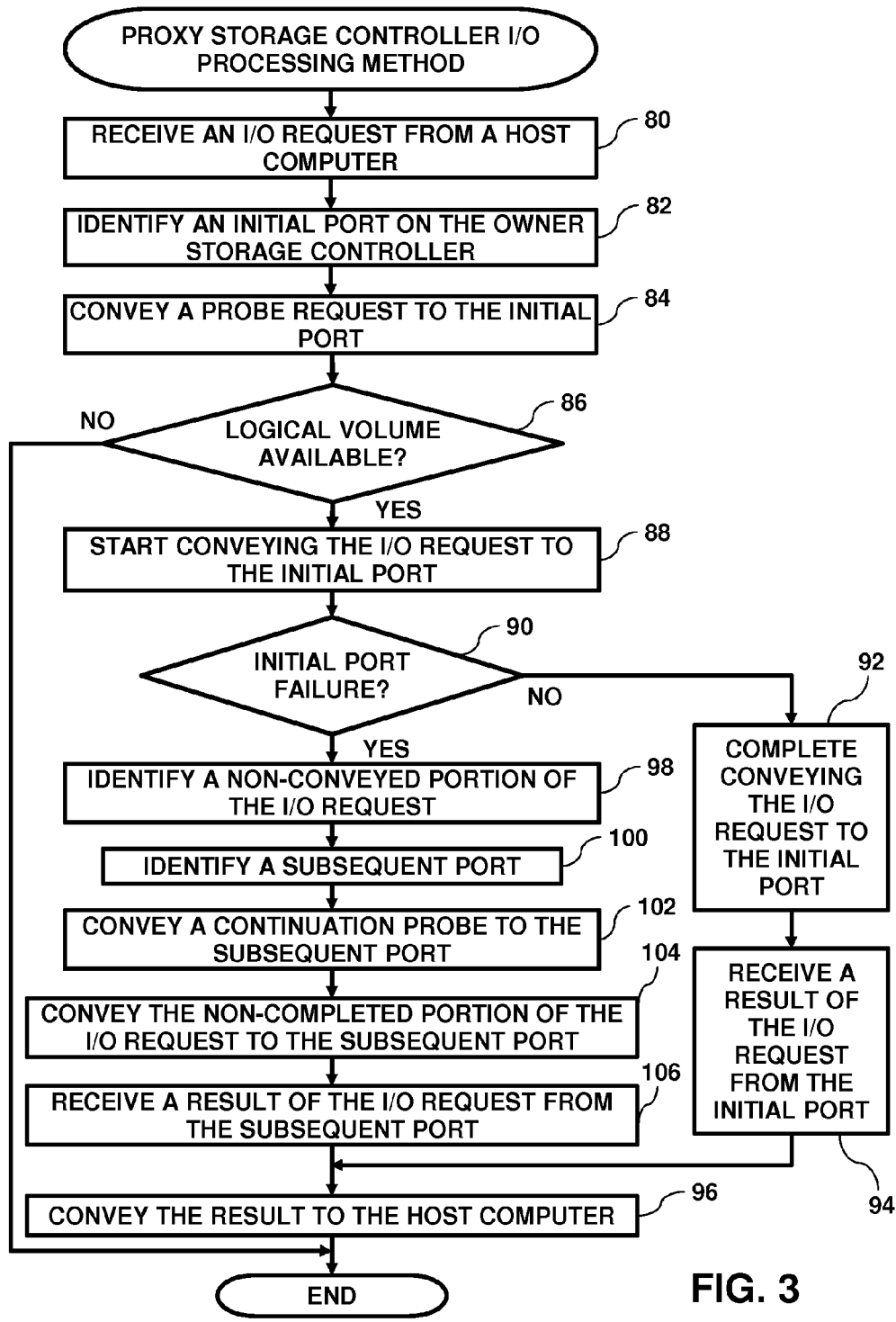
FIG. 3 is a flow diagram that schematically illustrates a method for a proxy storage controller to process a proxy I/O request for a logical volume stored on an owner storage controller, in accordance with an embodiment of the present invention.

FIG. 3 is a flow diagram that schematically illustrates a method for storage controller 34A to process a proxy I/O request received from host computer 22, in accordance with an embodiment of the present invention. In a first receive step 80, processor 64A receives, from host computer 22, an I/O request for volume 70B, and processor 64A configures the I/O request as a proxy I/O request upon determining that volume 70B is stored on storage controller 34B.

In a first identification step 82, processor 64A identifies an initial port 68B on storage controller 34B for processing the I/O request. In some embodiments the initial port comprises the least busy port 68B. In a first convey step 84, processor 64A conveys a probe request to initial port 68B to verify an availability of volume 70B for the I/O request. For example, volume 70B may currently be reserved by a different host computer 22, or volume 70B may have a read-only status and the I/O request may be for a write operation.

The probe request typically includes a header such as a SCSI command description block (CDB). In some embodiments, processor 64A can split the I/O request into multiple sub-requests, and the probe request may include a count of the sub-requests. Splitting an I/O request into multiple sub-requests is described in more detail in U.S. Patent Application "Load Balancing Input/Output Operations Between Two Computers", referenced above.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Additionally, since the I/O request can be divided into multiple sub-requests, the probe request also enables processors 64A and/or 64B to detect when the I/O operation indicated by the I/O request is complete, and the volume is consistent. For example, prior to taking a snapshot of volume 70B, processor 64 can verify that any pending sub-requests are completed, thereby ensuring volume integrity.

In a first decision step 86, if processor 64A receives a response from processor 64B indicating an availability of logical volume 70B for the I/O request, then in second convey step 88, processor 64A starts conveying the proxy I/O request to initial port 68B. In embodiments where processor 64A splits the I/O request into multiple sub-requests, processor 64A can start sending each of the sub-requests to initial port 68B. In the example described in the flow diagram shown in FIG. 3, processor 64A conveys a probe request prior to conveying the sub-requests. In some embodiments, processor 64A can incorporate the probe request into the first sub-request conveyed to processor 64B.

In a second decision step 90, if processor 64A does not detect a failure of initial port 68B while conveying the I/O request, then in a third convey step 92, processor 64A completes conveying the I/O request to the initial port. For example, in embodiments where processor 64A splits the I/O request into multiple sub-requests, processor 64A completes conveying all the sub-requests.

In a second receive step 94, processor 64A receives a result of the I/O request from initial port 68B. For example, if the I/O request comprises a read data request, then the response may include data read from volume 70B. Likewise, if the I/O request comprises a write data request, then the response may include an acknowledgement that the data was written successfully to logical volume 70B. Finally, in a fourth convey step 96, processor 64A conveys the result of the I/O request to the host computer, and the method ends.

Returning to step 90, if processor 64A detects a failure of initial port 68B while conveying the I/O request, then in a third identification step 98, processor 64A identifies a non-conveyed portion of the I/O request. For example, in embodiments where processor 64A splits the I/O request into multiple sub-requests, upon detecting a failure of initial port 68B, processor 64A can identify any non-conveyed sub-requests (i.e., sub-requests that are still waiting to be conveyed to processor 64B).

In a third identification step 100, processor 64A identifies a subsequent port 68B on storage controller 34B. In embodiments herein, initial port 68B may also be referred to as first port 68B, the subsequent port 68B may also be referred to as second port 68B. As described supra when identifying the initial port, the subsequent port may comprise the least bust port 68B. In a fourth convey step 102, processor 64A conveys a continuation probe to subsequent port 68B. In some embodiments, the continuation probe is similar to the probe request conveyed in step 84 in the sense that it initializes a context on storage controller 34B for receiving sub-requests. However, the continuation probe may skip any validity checks (e.g., checking for reservations) for processing the I/O request.

In a fifth convey step 104, upon receiving an response from processor 64B indicating that the continuation probe was received, processor 64A conveys the non-completed portion (e.g., the identified non-conveyed sub-requests) of the I/O request to subsequent port 68B, receives, in a third receive step 106, the result of the I/O request from the subsequent port, and the method continues with step 96. The response to the continuation probe verifies successful connectivity to storage controller 34A, thereby setting up a context for an atomic I/O operation comprising the non-completed portion of the I/O request.

Upon a failure of the initial port, there may still be I/O requests (or responses to I/O requests) pending on the initial port. In some embodiments the continuation probe can "clean-up" any pending sub-requests still pending on the initial port. In an alternative embodiment, processor 64A can convey a separate message to processor 64B to perform a clean-up on the initial port.

Returning to step 86, if processor 64A receives a response from processor 64B indicating that logical volume 70B is not available for the I/O operation, then processor 64A conveys a message indicating the non-availability of volume 70B to the host computer, and the method ends.

Owner Storage Controller I/O Request Processing

Figure 4:
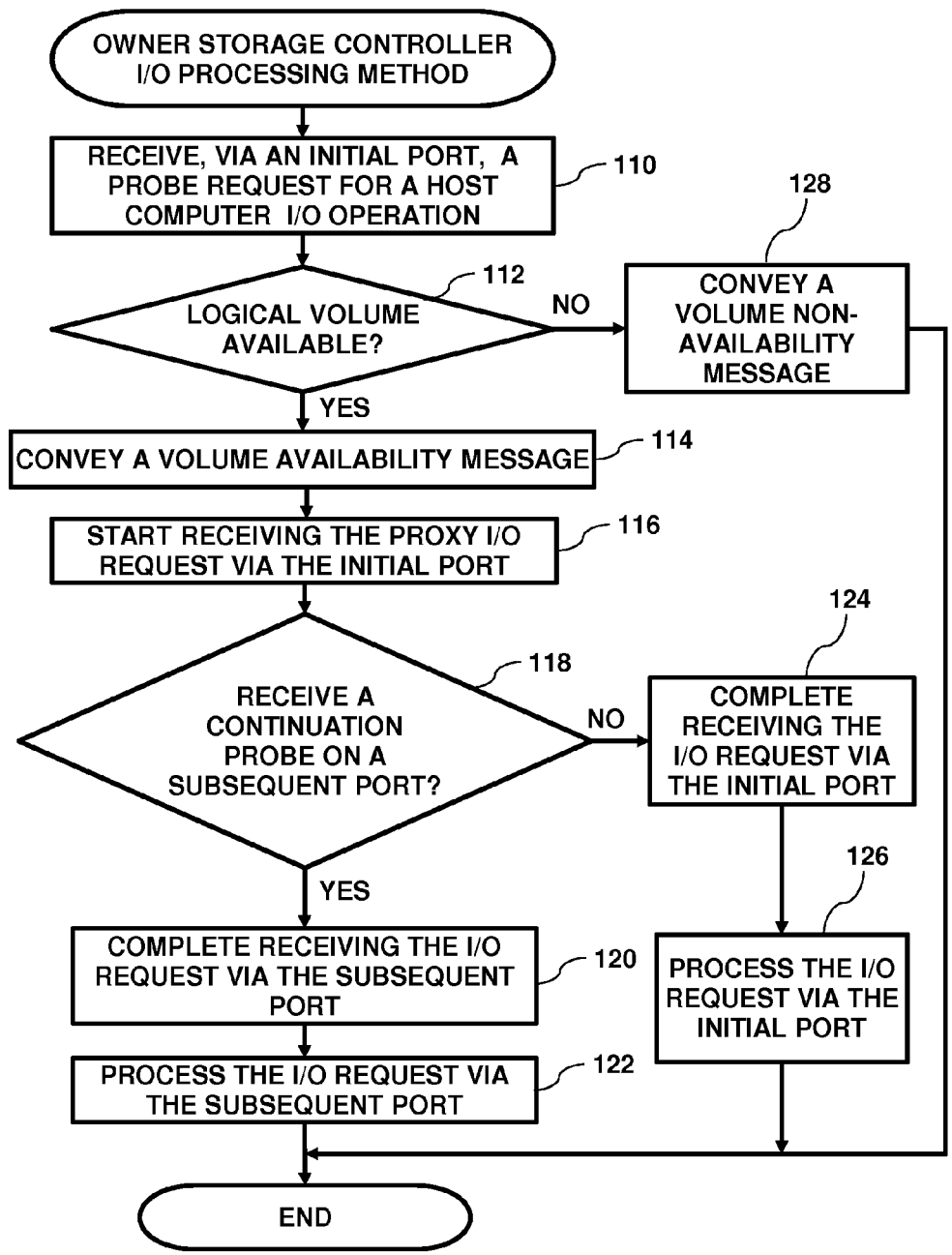
FIG. 4 is a flow diagram that schematically illustrates a method for an owner storage controller to process a proxy I/O request received from a proxy storage controller, in accordance with an embodiment of the present invention.

FIG. 4 is a flow diagram that schematically illustrates a method for storage controller 34B to process a proxy I/O request received from storage controller 34A, in accordance with an embodiment of the present invention. In first receive step 110, processor 64B receives, via an initial port 68B, a probe request to verify an availability (as described supra) of logical volume 70B for processing an I/O request from host computer 22.

In a first decision step 112, if logical volume 70B is available for the I/O request, then in a first convey step 114, processor 64B conveys, via initial port 68B, a message confirming the volume availability for the I/O request. In a second receive step 116, processor 64B starts receiving, via initial port 68B the proxy I/O request from processor 64A. In embodiments where processor 64A splits the proxy I/O request into multiple sub-requests, receiving the proxy I/O request comprises receiving the multiple sub-requests, and using information included in the probe request to "re-assemble" the sub-parts into the proxy I/O request.

In a second comparison step 118, if the proxy I/O request comprises multiple sub-requests, and processor 64B receives a continuation probe on a subsequent port 68B (different than initial port 68B) prior to receiving all the sub-requests, then in a third receive step 120, processor 64B completes receiving the proxy I/O request via subsequent port 68B. In a first processing step 122, processor 64B processes the proxy I/O request via subsequent port 68B, and the method ends.

For example, if the proxy I/O request comprises a request to read data from logical volume 70B, then processor 68B can retrieve the data from the logical volume, and convey the retrieved data to processor 64B via subsequent port 68B.

While the example shown in FIG. 4 describes a single failure of an owner port while processing a set of sub-requests (i.e., for a single I/O requests), a failure of two or more ports is considered to be within the spirit and scope of the present invention. For example, processor 64A may detect a failure of the subsequent port, and an additional continuation probe can be conveyed to a further (i.e., a third) owner port 64B to complete processing the I/O request using embodiments described herein.

Returning to step 118, if processor 64B does not receive a continuation probe while receiving the proxy I/O request, then in a fourth receive step 124, processor 64B completes receiving the proxy I/O request via initial port 68B. In a second processing step 126, processor 64B processes the proxy I/O request via the initial port in and the method ends.

Returning to step 112, if logical volume 70B is not available for the proxy I/O request, then in a second convey step 128, processor 64B conveys a non-availability message to processor 64A (i.e., in response to the probe request), and the message ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for configuring a first storage system as a proxy for a logical volume stored on a second storage system, comprising:

conveying, to an identified port, a probe request to verify an availability of the logical volume for an input/output (I/O) request; and upon receiving a response from a second storage system verifying the availability of the logical volume for the I/O request, conveying the I/O request to the identified port, receiving a result of the I/O request from the identified port, and conveying the result to a host computer.

2. The method of claim 1, further comprising receiving, by the first storage system, the I/O request from the host computer for the logical volume, wherein the host computer identifies the port on the second storage system for the I/O request.

3. The method according to claim 1, further including, upon receiving a response from the second storage system verifying the availability of the logical volume for the I/O request, conveying the I/O request to the identified port, receiving a result of the I/O request from the identified port, and conveying the result to the host computer;
wherein the I/O request is selected from a list comprising a request to read data from the logical volume and a request to write data to the logical volume.

4. The method according to claim 1, and comprising receiving, from the second storage system, a response to the probe request indicating a non-availability of the logical volume for the I/O request, and conveying a message to the host computer a message indicating the non-availability.

5. The method according to claim 2, wherein the second storage system has multiple ports, and identifying the port comprises identifying a least busy port of the multiple ports.

6. The method according to claim 4, wherein the multiple ports comprise Small Computer System Interface (SCSI) ports coupled to a storage area network (SAN).

7. The method according to claim 1, wherein conveying the I/O request to the identified port comprises splitting the I/O request into multiple sub-requests, and conveying the multiple sub-requests to the identified port.

8. The method according to claim 6, wherein the identified port comprises a first port, and comprising upon detecting, a failure in the first port while conveying the multiple sub-requests, identifying any non-conveyed sub-requests, identifying a second port on the second storage system for the I/O request, conveying the identified sub-requests to the second port, and upon receiving a result of the I/O request from the second port, conveying the result to the host computer.

9. A proxy storage system, comprising:

a proxy port coupled to a storage area network (SAN); and
a processor configured:

to convey, to an identified owner port, a probe request to verify an availability of the logical volume for an I/O request; and upon receiving, via the proxy port, a response from an owner storage system confirming the availability of the logical volume for the I/O request, to convey the I/O request to the identified owner port, to receive a result of the I/O request from the identified owner port, and to convey the result to a host computer;

wherein the I/O request is selected from a list comprising a request to read data from the logical volume and a request to write data to the logical volume.

10. The proxy storage system according to claim 8, wherein the processor is further configured:
to receive the input/output (I/O) request from the host computer for a logical volume, the logical volume mapped between the host computer and the proxy storage system, and
to identify the owner port on the owner storage system for the I/O request, the owner storage system storing the logical volume.

11. The proxy storage system according to claim 8, wherein the processor is configured to receive, from the second storage system, a response to the probe request indicating a non-availability of the logical volume for the I/O request, and to convey a message to the host computer a message indicating the non-availability.

12. The proxy storage system according to claim 8, wherein the second storage system has multiple owner ports, and the processor is configured to identify the owner port by identifying a least busy owner port of the multiple owner ports.

13. The proxy storage system according to claim 8, wherein the proxy port comprises a Small Computer System Interface (SCSI).

14. The proxy storage system according to claim 8, wherein the processor is configured to convey the I/O request to the identified owner port by splitting the I/O request into multiple sub-requests, and conveying the multiple sub-requests to the identified owner port.

15. The proxy storage system according to claim 13, wherein the identified owner port comprises a first owner port, and wherein the processor is configured upon detecting a failure in the first owner port while conveying the multiple sub-requests, to identify any non-conveyed sub-requests, to identify a second owner port on the owner storage system for the I/O request, to convey identified sub-requests to the second owner port, to receive a result of the I/O request from the second owner port, and to convey the result to the host computer.

16. An owner storage system, comprising:
a storage device configured to store a logical volume;
multiple ports configured to communicate with a proxy storage system via a storage area network (SAN); and
a processor configured:
to receive, via one of a plurality of ports, a probe request from the proxy storage system to verify an availability of the logical volume for an input/output (I/O) request from a host computer in communication with the proxy storage system, the logical volume being mapped between the host computer and the proxy storage system, and
to verify the availability of the logical volume for the I/O request.

17. The owner storage system according to claim 15, wherein the processor is further configured, subsequent the owner storage system according to claim 15, wherein the multiple ports comprise Small Computer System Interface (SCSI) ports.

18. The owner storage system according to claim 15, wherein the I/O request is selected from a list comprising a request to read data from the logical volume and a request to write data to the logical volume.

19. The owner storage system according to claim 15, wherein upon detecting that the logical volume is not available for the I/O request, the processor is configured to convey a non-availability message to the proxy storage system in response to the probe request.

20. The owner storage system according to claim 15, wherein the proxy I/O request comprises multiple sub-requests.

21. The owner storage system according to claim 19, wherein the one of the ports comprises a first of the ports, and the processor starts receiving the multiple sub-requests via the first port, and wherein upon receiving a continuation port via a second of the ports, the processor is configured to complete receiving the sub-requests via the second port, to reassemble the proxy I/O request from the received sub-requests, and to process the proxy I/O request.

\* \* \* \* \*